United States Patent [19]
van Beem et al.

[11] 3,978,014
[45] Aug. 31, 1976

[54] BITUMINOUS COMPOSITIONS CONTAINING TWO POLYMERS

[75] Inventors: Eric J. van Beem; Pieter Brasser, both of Amsterdam, Netherlands

[73] Assignee: Shell Oil Company, Houston, Tex.

[22] Filed: Feb. 28, 1975

[21] Appl. No.: 553,948

[30] Foreign Application Priority Data
Aug. 27, 1974 Netherlands.................. 7411373

[52] U.S. Cl................. 260/28.5 AS; 260/33.6 AO; 260/33.8 R; 260/33.8 UA
[51] Int. Cl.$^2$......................... C08L 91/00
[58] Field of Search............. 260/27, 28.5, 25, 33.2

[56] References Cited
UNITED STATES PATENTS

| | | | |
|---|---|---|---|
| 2,716,073 | 8/1955 | Cunder.............................. | 106/243 |
| 3,325,430 | 6/1967 | Grasley............................... | 260/25 |

OTHER PUBLICATIONS
Railsback, "Rubber Age", Jan. 1964, pp. 583 to 587.

*Primary Examiner*—Lewis T. Jacobs
*Assistant Examiner*—William Parker

[57] ABSTRACT

Bituminous composition with improved adhesive properties comprising:

a. 95–75%w of a bituminous component Q having an aromaticity exceeding $0.004 \times P + 0.280$, in which P is the n-heptane asphaltene content;

b. 4–15%w of a block copolymer $M_1$, preferably a polystyrene-polyalkadiene-polystyrene;

c. 4–15%w of a thermoplastic polymer $M_2$, different from $M_1$ and which has a mol. weight above 10,000, a solubility parameter 7.8 – 8.8 and a crystallinity below 60 percent at 25°C.

10 Claims, No Drawings

BITUMINOUS COMPOSITIONS CONTAINING TWO POLYMERS

DESCRIPTION OF THE INVENTION

The invention relates to a process for the preparation of new bituminous compositions from a bituminous component and two or more polymeric components.

Bituminous compositions consisting of a bituminous component and a polymer have been described in the literature for various applications such as joint fillers, adhesives, protective layers, impregnating agents and roofing material.

Thus Dutch patent application No. 6,913,299, describes a process for the preparation of bituminous compositions, in which a bituminous component of a certain defined aromaticity is blended with at most 15% of a block copolymer with the general formula A-B-A, in which the two A's represent the same or different thermoplastic non-elastomeric polymer blocks prepared by polymerization of one or more vinyl aromatics and in which B represents an elastomeric polymer block prepared by polymerization of one or more conjugated dienes or by copolymerization of one or more conjugated dienes with one or more vinyl aromatics, polymer block B being completely or partly hydrogenated, if desired.

According to the application envisaged, the compositions concered are to meet various stringent requirements, for instance with regard to storage stability, penetration, softening point, breaking point and adhesion.

It has now been found that bituminous compositions with improved properties can be obtained by using two different polymers.

The invention therefore relates to a process for the preparation of new bituminous compositions by blending three components, viz a. 92–75%x of a bituminous component Q whose aromaticity, expressed as a fraction of aromatic carbon of the n-heptane malthene phase ($f_a$) is higher than $0.004 \times P + 0.280$, in which P represents the n-heptane asphaltene content (in %x) of the bituminous component;

b. 4–15%w of a block copolymer $M_1$ with the general formula A-B-A, in which the two A's represent the same or different thermoplastic non-elastomeric polymer blocks prepared by polymerization of one or more monoalkenyl aromatics and in which B represents an elastomeric polymer block prepared either by polymerization of one or more conjugated alkadienes with one or more monoalkenyl aromatics, polymer block B, mentioned above, being completely or partly hydrogenated, if desired; and c. 4–15 percent of a thermoplastic polymer $M_2$ differing from component $M_1$ and having a molecular weight higher than 10,000, a solubility parameter between 7.8 and 8.8 and a crystallinity of less than 60 percent at 25°C.

To obtain blends with a good storage stability it is necessary to choose a bituminous compound whose aromaticity, expressed as the fraction of aromatic carbon in the n-heptane maltene phase ($f_a$), is higher than $0.004 \times P + 0.280$, in which P represents the n-heptane asphaltenes content of the bitumen. These blends are either microdisperse or homogenous. Blends of a bitumen component with an aromaticity $f_a$ $0.004 \times P +$ 0.028 are heterogeneous and possess insufficient storage stability.

The best results, in particular with regard to the flow properties at high temperature, are obtained with blends of a microdisperse nature. Whether a blend is of the microdisperse or of the homogeneous type depends both on the aromaticity of the bitumen component and on the nature of the two polymeric components. Blends of a bitumen component with an $f_a > 0.004 \times P + 0.500$ are usually homogeneous and therefore less suitable.

Suitable bituminous components for the preparation of the bituminous compositions according to the invention are in the first place bituminous components prepared from petroleum. Among the examples of suitable bituminous components are straight run bitumens, propane bitumens, or blown bitumens and blends of two or more of the bitumens mentioned hereinbefore in such a proportion that the desired aromaticity according to the formula is reached. Preference is given to the application of a straight run bitumen, a propane bitumen or a blend of a straight run and a propane bitumen as the bituminous component in the preparation of bituminous compositions according to the invention.

Very suitable for use as bituminous components are blends of one or more of the above-mentioned bitumens with aromatic petroleum extracts, aromatic petroleum distillates or paraffinic-naphthenic petroleum distillates in such a proportion that the above-mentioned aromaticity according to the invention is also reached. When a bituminous component of this type is applied preference is given to a blend of a propane bitumen and an aromatic petroleum extract, in particular a blend of a propane bitumen and an aromatic extract of a heavy lubricating oil.

The present compositions are preferably prepared starting from bituminous components having a penetration at 25°C between 10 and 2,000.

According to the invention use is made of two different polymers $M_1$ and $M_2$, each having a different function. Polymeric component $M_1$ serves to give the final composition an improved resistance to flow at higher temperatures, while polymeric component $M_2$ causes improved adhesion to other materials.

The use of two different polymers each having a function of its own in the final composition permits a better adjustment of product specifications to the application envisaged.

Polymeric component $M_1$ is a block copolymer in which at least two polymer blocks A are the same or different thermoplastic non-elastomeric polymer blocks prepared by polymerization of one or more monoalkenyl aromatics and in which at least one polymer block B is an elastomeric polymer block prepared either by polymerization of one or more conjugated alkadienes or by copolymerization of one or more conjugated alkadienes with one or more monovinyl aromatics.

Suitable monoalkenyl aromatic monomers for the preparation of the thermoplastic polymer blocks A in component $M_1$, are in particular styrene, alpha-methyl-styrene and tert-butyl-styrene.

Suitable conjugated alkadienes for the preparation of elastomeric polymer blocks B are the alkadienes having 4 to 8 carbon atoms per molecule, in particular butadiene and isoprene.

If desired, polymer blocks B may be hydrogenated preferably to reduce at least about 90% of the olefinic bonds.

The thermoplastic polymer blocks A of component $M_1$ preferably have a molecular weight between 5,000 and 100,000, in particular between 10,000 and 30,000. Elastomeric polymer block B preferably has a molecular weight between 20,000 and 1,000,000, in particular between 30,000 and 150,000.

The second polymer component $M_2$ in the composition according to the invention is defined by three requirements, viz. a molecular weight of at least 10,000, a solubility parameter (as defined in Dutch patent application 6,706,408) between 7.8 and 8.8 and a crystallinity of less than 60 percent at 25°C. Preferably use is made of polymeric components $M_2$ with a solubility parameter between 8.0 and 8.5 and a crystallinity of not more than 20%.

Polymers of several types can meet this requirement. Homopolymers and modified homopolymers as well as copolymers and block copolymers can be used as component $M_2$ in the compositions according to the invention.

Suitable homopolymers are polyalkenes such as polyethylene, polypropylene and polyisobutene and polyalkadienes such as polybutadiene and polyisoprene.

Suitable modified homopolymers are chlorinated polyalkenes, such as chlorinated polyethylene and chlorinated polypropylene.

Copolymers which may be used as component $M_2$ in the compositions according to the invention can be prepared by copolymerization of two or more olefinically unsaturated compounds, such as ethylene, propylene, isobutene, butadiene, isoprene, styrene, vinyl acetate, ethyl acrylate, n-butyl acrylate and methyl methacrylate. Suitable copolymers of this type are, for instance, ethylene-propylene, ethylene-vinyl acetate, ethylene-n-butyl acrylate and styrene-butadiene.

Block copolymers which may be used as component $M_2$ may be of the same type as component $M_1$. They then have the linear or branched configuration, the most simple having the general formula $A'-B'-A'$, in which the two groups of $A'$ represent the same or different thermoplastic polymer blocks prepared by polymerization of one or more alkenyl aromatics, and in which $B'$ represents an elastomeric polymer block prepared by polymerization of one or more conjugated alkadienes with one or more alkenyl aromatics.

Favorable results are obtained by using block copolymers in which blocks $A'$ consist of polystyrene and block $B'$ consists of polyisoprene. Polymer blocks $A'$ preferably have a molecular weight of not more than 10,000 and polymer block $B'$ one between 120,000 and 500,000.

It will be clear that not all polymers of the classes mentioned can be used as component $M_2$ in the compositions according to the invention. A primary condition is that the three requirements mentioned hereinbefore with regard to molecular weight, solubility parameter and crystallinity have to be met.

The preparation of the compositions can be carried out in a simple way by stirring the two polymeric components as finely ground solid substance or in the form of a solution, for instance in benzene, toluene and hydrocarbon oil or a chlorinated hydrocarbon such as dichloromethane, into the molten bituminous component. If desired, the solvent may afterwards be removed by evaporation.

The two polymeric components $M_1$ and $M_2$ are used in a proportion of from 4 to 15%w relative to the final blend. The total content of the two polymers in the final blend preferably amount to 10–25 %w.

If compositions according to the invention are used as joint fillers for concrete slabs or blocks, it may be advisable, in order to improve the adhesion of the bituminous mass to the concrete, to pretreat the latter with a so-called primer. Suitable primers can be prepared by dissolving a copolymer of the A-B-A type as hereinbefore described together with coal-tar resin in a suitable liquid, for instance in methyl ethyl ketone, methyl isobutyl ketone, ethyl acetate, toluene or a mixture of two or more of these compounds.

EXAMPLES

General

A number of bituminous compositions were prepared by blending a bituminous component Q and two polymeric components. In addition, for comparison, a number of mixtures were prepared of the same bituminous component with a single polymer. Of all the mixtures a number of properties were determined related directly with the application envisaged.

The bituminous components Q that were used are described in detail in Table A, the two polymeric components $M_1$ and $M_2$ in Table B and Table C, resectively.

TABLE A

Bituminous components (Q)

Bit. 1: bituminous component with a penetration of 400 × 0.1mm at 25°C and an $f_a$ of the n-$C_7$ maltene phase of 0.430 consisting of:
a. 64%w of a propane bitumen and
b. 36%w of an aromatic lubricating oil extract Bit. 2: bituminous component with a penetration of 200 × 0.1mm at 25°C and an $f_a$ of the n-$C_7$ maltene phase of 0.429 consisting of:
a. 70% of a propane bitumen and
b. 30% of an aromatic lubricating oil extract.

Bit. 3: bituminous component with a penetration of 80 × 0.1mm at 25°C and an $f_a$ of the n-$C_7$ maltene phase of 0.426 consisting of:
a. 78%x of a propane bitumen and
b. 22%w of an aromatic lubricating oil extract.

The propane bitumen was prepared from a crude from the Middle East and had a penetration of 10 × 0.1mm at 25°C, an $f_a$ of the n-$C_7$ maltene phase of 0.42 and a n-$C_7$ asphaltene content of 9%w. The aromatic lubricating oil from crude oil also originating from the Middle East; it had an $f_a$ of 0.45.

TABLE B

Polymers $M_1$ $P_1$ polystyrene-polybutadiene-polystyrene block copolymer, molecular weight 20,000–40,000–20,000

$P_2$: polystyrene-polybutadiene-polystyrene block copolymer, molecular weight 14,000–65,000–14,000

$P_3$: polystyrene-(hydrogenated polyisoprene)-polystyrene block copolymer, molecular weight 10,000–(50,000)–10,000

TABLE C

| Polymers $M_2$ | | |
|---|---|---|
| $P_4$: | polyisoprene | |
| | molecular weight | 500,000 |
| | solubility parameter | 8.0 |
| | crystallinity | 0% |
| $P_5$: | chlorinated polyethylene | |
| | molecular weight | 50,000 |
| | solubility parameter | 8.2 |

TABLE C-continued

| | Polymers $M_2$ | |
|---|---|---|
| | crystallinity | 40% |
| $P_6$: | ethylene-vinyl acetate copolymer | |
| | molecular weight | 300,000 |
| | solubility parameter | 8.4 |
| | crystallinity | 20% |
| $P_7$: | polystyrene-polyisoprene-polystyrene block copolymer | |
| | molecular weight | 500–140,000–9,500 |
| | solubility parameter | 8.2 |
| | crystallinity | 0% |

Cold-Setting Adhesives

A number of compositions were prepared to serve as cold-setting adhesives, in particular for the adhesion of solid materials, such as aluminum or steel or wood. All compositions were tested for penetration at 25°C (according to ASTMD5) and Ring and Ball softening point $T_{R\&B}$ in °C (according to ASTM D36). The peel strength was determined as follows:

The composition to be tested, heated to a temperature of about 160°C, was applied to a strip of aluminum foil, 5 cm wide and about 15 cm long, in a layer of 1½mm thickness. The strip was then pressed lengthwise with its coated side onto the surface of a steel cylinder, suspended so as to rotate freely. After 24 hours a tensile test was carried out on the strip perpendicular to the tangent to the cylinder surface, during which the peel velocity was measured. The tensile force required to reach a peel velocity of 1 cm/min was calculated and expressed as peel strength in kg/cm width.

Compositions 1–4 are compositions according to the invention with two polymers $M_1$ and $M_2$, compositions 5–10 being reference materials in which only one polymer has been incorporated. The superior properties of compositions 1–4 are evident from Table D. Compositions 5–10 cannot be used for the purpose envisaged.

Hot-Setting Adhesive

A hot-setting adhesive (composition No. 11) to be used for roofing material and sandwich constructions was prepared by blending:
- 90%w of Bit. 3
- 5%w of $P_3$
- 5%w of $P_6$ The penetration at 25°C amounted to 62 × 0.1mm and the R&B softening point ($T_{R\&B}$) 75°C. The peel strength of polyethylene/steel amounted to 5 kg/cm.

A comparable product (compositon No. 12) was obtained by blending 90%w of Bit.3, 5%w of $P_2$ and 5%w of $P_7$.

Membrane Material (Composition No. 13)

A composition suitable for the application of layers impermeable to water for instance onto concrete constructions and for hydraulic applications (canals, reservoirs) was prepared by blending:
- 80%w of Bit.2
- 10%w of $P_1$
- 10%w of $P_6$ The penetration at 25°C amounted to 77 × 0.1mm and the R&B softening point 100°C. Other important properties of this composition are:

| | |
|---|---|
| Fraass breaking point | < −35°C |
| Cold bending test DIN 52123 at −18°C | no crack formation |
| Flow test DIN 52123 at 70°C | no flow |

Peel strength of membrane/wool (composition applied hot in layers of 2mm after flame treatment):2kg/cm.

Joint-Filling Compound

A compositon (No. 14) suitable to serve as point-filling compound for concrete and such-like construc-

TABLE D

| No. | Components Q, $M_1$ en $M_2$ %w | Pen/25°C × 01mm | $T_{R\&B}$ °C | Peel strength 25°C Al/steel kg/cm |
|---|---|---|---|---|
| 1 | 74 Bit.1<br>10,5 $P_1$ blended with<br>5,5 extender oil<br>10 $P_7$ | 115 | 90 | 3<br>(Al/wood: 4) |
| 2 | 80 Bit.1<br>10 $P_3$<br>10 $P_6$ | 50 | 102 | 1 |
| 3 | 75 Bit.1<br>10 $P_1$ blended with<br>5 extender oil<br>10 $P_5$ | 50 | 90 | 1 |
| 4 | 75 Bit.1<br>10 $P_1$ blended with<br>5 extender oil<br>10 $P_4$ | 115 | 95 | 1,5 |
| 5 | 84 Bit.1<br>10,5 $P_2$ blended with<br>5,5 extender oil | 125 | 87 | 0,2 |
| 6 | 90 Bit.1<br>10 $P_3$ | 60 | 90 | 0,3 |
| 7 | 90 Bit.1<br>10 $P_4$ | 280 | 35 | 0,1 |
| 8 | 90 Bit.1<br>10 $P_5$ | 220 | 48 | 0,1 |
| 9 | 80 Bit.1<br>20 $P_6$ | 135 | 58 | 0,6 |
| 10 | 80 Bit.1<br>20 $P_7$ | 95 | 60 | 0,5 | tional elements as well as for mastic asphalt floors was obtained by blending:

81%w of Bit.2
7,5%w of $P_1$ mixed with
4%w of extender oil
7,5%w of $P_7$

If required, the compound can be used together with suitable fillers.

What is claimed is:

1. A bituminous composition comprising:
   a. 92–75%w of a bituminous component Q whose aromaticity expressed as a fraction of aromatic carbon of the n-heptane maltene phase ($F_a$) is higher than $0.004 \times P + 0.280$, in which P represents the n-heptane asphaltene content of the bituminous component;
   b. 4–15%w of a block copolymer $M_1$ in which at least two A polymer blocks are the same or different thermoplastic non-elastomeric polymer blocks prepared by polymerization of one or more monoalkenyl aromatics and in which at least one polymer block B is an elastomeric polymer block prepared either by polymerization of one or more conjugated alkadienes, or by copolymerization of one or more conjugated alkadienes with one or more monoalkenyl aromatics, polymer block B, mentioned above, being completely or partly hydrogenated, if desired; and
   c. 4–15%w of a thermoplastic polymer $M_2$ differing from component $M_1$ and having a molecular weight higher than 10,000, a solubility parameter between 7.8 and 8.8 and a crystallinity of less than 60 percent at 25°C.

2. A composition according to claim 1, wherein the aromaticity of the bituminous component expressed as fraction of aromatic carbon of the n-heptane maltene phase ($f_a$) is lower than $0.004 \times P + 0.500$, in which P represents the n-heptane asphaltene content of the bituminous component.

3. A composition according to claim 1 wherein the bituminous component is a blend of propane bitumen and an aromatic extract of a heavy lubricating oil.

4. A composition according to claim 1 wherein the polymer blocks A in polymer $M_1$ consist of polystyrene.

5. A composition according to claim 1 wherein polymer block B in polymer block $M_1$ consists of polybutadiene.

6. A composition according to claim 1 wherein polymer block B is polymer $M_1$ consists of polyisoprene.

7. A composition according to claim 1 wherein the molecular weight of polymer blocks A in polymer $M_1$ ranges from 5,000 to 100,000, preferably from 10,000 to 30,000.

8. A composition according to claim 1 wherein the molecular weight of the elastomeric polymer block B in polymer $M_1$ ranges from 20,000 to 1,000,000, preferably from 30,000 to 150,000.

9. A composition according to claim 1 wherein polymeric component $M_2$ has a solubility parameter between 8.0 and 8.5 and a crystallinity of not more than 20 percent.

10. A composition according to claim 1 wherein polymeric component $M_2$ is a block copolymer of the general formula A'-B'-A', where the two groups of A' represent the same or different thermoplastic non-elastomeric polymer blocks prepared by polymerization of one or more vinyl aromatics, and where B' represents an elastomeric polymer block prepared either by polymerization of one or more conjugated alkadienes or by copolymerization of one or more conjugated alkadienes with one or more mono vinyl aromatics.

* * * * *